(12) United States Patent
Fletcher et al.

(10) Patent No.: US 8,135,664 B2
(45) Date of Patent: Mar. 13, 2012

(54) CHANGE MANAGEMENT USING COLLECTIVE DATA

(75) Inventors: James C. Fletcher, Apex, NC (US); Kimberly D. Kenna, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 12/130,980

(22) Filed: May 30, 2008

(65) Prior Publication Data

US 2009/0299923 A1    Dec. 3, 2009

(51) Int. Cl.
*G06F 15/00* (2006.01)
*G06F 15/18* (2006.01)

(52) U.S. Cl. ........... 706/62; 706/45; 706/46; 706/47; 706/48; 703/1; 703/6; 703/7

(58) Field of Classification Search .............. None
See application file for complete search history.

(56) References Cited

U.S. PATENT DOCUMENTS

| | | | |
|---|---|---|---|
| 5,515,524 A * | 5/1996 | Lynch et al. | 703/13 |
| 5,825,651 A * | 10/1998 | Gupta et al. | 700/103 |
| 6,002,854 A * | 12/1999 | Lynch et al. | 703/1 |
| 6,035,305 A * | 3/2000 | Strevey et al. | 1/1 |
| 6,405,308 B1 * | 6/2002 | Gupta et al. | 713/1 |
| 7,043,407 B2 * | 5/2006 | Lynch et al. | 703/1 |
| 7,127,313 B2 * | 10/2006 | Neri | 700/103 |
| 7,464,064 B1 * | 12/2008 | Smith | 706/47 |
| 7,584,079 B2 * | 9/2009 | Lichtenberg et al. | 703/2 |
| 7,739,080 B1 * | 6/2010 | Beck et al. | 703/2 |
| 2007/0233630 A1 * | 10/2007 | Kulkarni et al. | 706/47 |

* cited by examiner

*Primary Examiner* — Omar Fernandez Rivas
(74) *Attorney, Agent, or Firm* — Steven M. Greenberg, Esq.; Carey, Rodriguez, Greenberg & O'Keefe

(57) ABSTRACT

A method for providing information associated with configuration changes to a computer system is provided. The method includes receiving a description of a starting configuration and a description of a configuration change. The method further includes linking the description of the starting configuration and the description of the configuration change and reading a record linked to the description of a configuration change, wherein the record includes advice about the configuration change and a total result value indicating a rate of success of the configuration change when the advice is followed. The method further includes receiving a first result value from the user indicating a result of the configuration change in light of the advice and calculating a new total result value that indicates a rate of success of the configuration change based on the total result value and the first result value.

17 Claims, 3 Drawing Sheets

CHANGE MANAGEMENT USING COLLECTIVE DATA

BACKGROUND OF THE INVENTION

1. Field of the Invention

The present invention relates to providing efficient enforced resource consumption rate limits. In particular, it relates to determining when to recalculate resource availability.

2. Description of the Related Art

The task of modern network administration differs significantly from that of days gone by. Not just a decade ago, network administration primarily entailed the addition and deletion of network users, the management of print queues, and the supervision and operation of daily backup procedures. Most if not all resources required by network applications remained present in the network itself, and few if any network applications depended upon the operation of other, co-executing applications.

Much has changed since the early days of network computing. Today, enterprise computing permeates the electronic landscape. While some enterprise applications remain largely stand-alone, most rely in some respect on a co-existing enterprise application or a soft enterprise resource, such as a database application, web application server, or other cooperating component. Thus, the administration of the network has advanced far beyond user and print queue administration and daily backup routines. Today, the inter-dependencies among network components present a significant challenge to the network administrator. In this regard, the management of a single network component can depend upon the state of a multiplicity of other network components.

Changing components or configuration settings with a network architecture requires careful consideration of the potential impact of a given change. System changes generally are known to be the source of architectural missteps in even the simplest of network structures. Further, as system complexity increases, the number of errors caused by a configuration change increases exponentially. Thus, system unavailability in a complex computing network is typically caused by an incorrectly applied configuration change.

The most useful and relevant history of past configuration changes is usually not easily accessible to an individual making a configuration change. Although the relevant data may be available, finding the data is heavily reliant on the specifics of the current configuration and the configuration change desired. Browsing or searching through the available configuration change data can be time consuming and tedious for the user. Additionally, available configuration change data can sometimes be faulty or comply incorrect. Thus, there is currently no easy way to find the best and most relevant advice regarding configuration changes on a complex computing network. For this reason, configuration changes are often made blindly with regard to the prior experience of others making configuration changes.

Therefore, there is a need for improvements over the prior art, and more particularly, there is a need for a more efficient way of effectuating a change to a configuration in a complex computing network.

BRIEF SUMMARY OF THE INVENTION

Embodiments of the present invention address deficiencies of the art in respect to enterprise computing and network administration. In one embodiment of the invention, a method for providing information associated with configuration changes to a computer system is provided. The method includes receiving a description of a starting configuration and a description of a configuration change. The method further includes linking the description of the starting configuration and the description of the configuration change and reading a record linked to the description of a configuration change, wherein the record includes advice about the configuration change and a total result value indicating a rate of success of the configuration change when the advice is followed. The method further includes receiving a first result value from the user indicating a result of the configuration change in light of the advice, responsive to execution of the configuration change by the user and calculating a new total result value that indicates a rate of success of the configuration change based on the total result value and the first result value.

In yet another embodiment of the invention, a computer program product comprising a computer usable medium embodying computer usable program code for providing information associated with configuration changes to a computer system can be provided. The computer program product includes computer usable program code for receiving a description of a starting configuration and a description of a configuration change. The computer program product further includes computer usable program code for linking the description of the starting configuration and the description of the configuration change and reading a record linked to the description of a configuration change, wherein the record includes advice about the configuration change and a total result value indicating a rate of success of the configuration change when the advice is followed. The computer program product further includes computer usable program code for receiving a first result value from the user indicating a result of the configuration change in light of the advice, responsive to execution of the configuration change by the user and calculating a new total result value that indicates a rate of success of the configuration change based on the total result value and the first result value.

In yet another embodiment of the invention, a computer for providing information associated with configuration changes to a computer system can be provided. The computer includes a repository for storing a description of a starting configuration linked to a description of a configuration change and a record linked to the description of a configuration change, wherein the record includes advice about the configuration change and a total result value indicating a rate of success of the configuration change when the advice is followed. The computer further includes a user interface for receiving a first result value from the user indicating a result of the configuration change in light of the advice, responsive to execution of the configuration change by the user. The computer further includes a processor configured for calculating a new total result value that indicates a rate of success of the configuration change based on the total result value and the first result value.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention address deficiencies of the art in respect to enterprise computing and network administration. In one embodiment of the invention, a method for providing information associated with configuration changes to a computer system is provided. The method includes receiving a description of a starting configuration and a description of a configuration change. The method further includes linking the description of the starting configuration and the description of the configuration change and reading a record linked to the description of a configuration change, wherein the record includes advice about the configuration change and a total result value indicating a rate of success of the configuration change when the advice is followed. The method further includes receiving a first result value from the user indicating a result of the configuration change in light of the advice, responsive to execution of the configuration change by the user and calculating a new total result value that indicates a rate of success of the configuration change based on the total result value and the first result value.

Furthermore, a rate of success indicator can be provided to indicate the rate of success for varying subsets and/or permutations of the initial configuration data and the proposed configuration change. Additionally, the present invention can provide statistics and rate of success data for initial configurations that are not an identical match.

Figure 1:
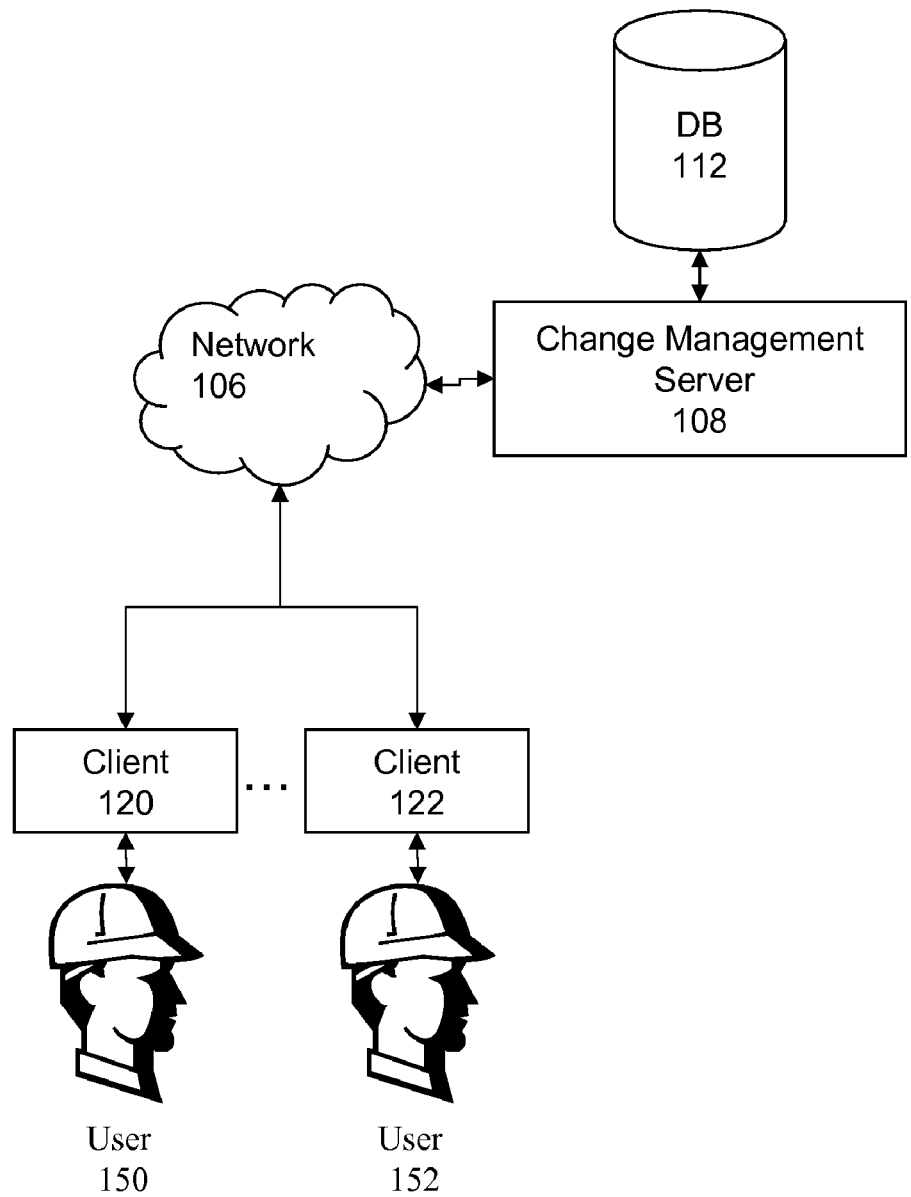
FIG. 1 is an illustration of a block diagram showing the network architecture of an application in accordance with the principles of the present invention.

Referring now to the drawing figures in which like reference designators refer to like elements, there is shown in FIG. 1 an illustration of a block diagram showing the network architecture of an application in accordance with the principles of the present invention. FIG. 1 shows an embodiment of the present invention wherein users 150-152 utilize client computers 120, 122, respectively, to interact with change management server 108 over a network 106, such as in an application service provider implementation.

FIG. 1 shows that connected to network 106 are client computers 120-122, which comprise, for example, workstations, desktop personal computers or servers. Each of the host computing systems 120-122 can support the operation of one or more computing applications. The computing applications can range from directed computing solutions addressing particular end user business needs, to utility applications addressing the management of the data processing system itself, to core computing applications such as application servers, content servers, file servers, operating systems, and the like.

The change management server 108 serves a change management application to multiple host computing systems 120-122. Change management server 108 may be any commercially available server, such as the IBM eServer xSeries server. It should be noted that although FIG. 1 shows only client computers 120-122 and one change management server 108, the system of the present invention supports any number of users and servers connected to the network 106.

In one embodiment of the present invention, the application of change management server 108 is a client-server application having a client portion that resides on the computers 120-122 and a server application that resides on change management server 108. In another embodiment of the present invention, the client portion of the application of change management server 108 that resides on the computers 120-122 is simply a web browser.

FIG. 1 further shows change management server 108 includes a database 112, which is a repository for data used by computers 120-122 and change management server 106 during the course of operation. The data stored in database 112 is described in greater detail below. The database 112 may adhere to any one of the flat model, hierarchical model, object-oriented model or a relational model for databases. Further, the database 112 can be any commercially available database, such as an IBM DB2 database server.

The database 112 may also include a database management system, which is an application that controls the organization, storage and retrieval of data (fields, records and files) in a database. A database management system accepts requests for data from a server and instructs the operating system to transfer the appropriate data. A database management system may also control the security and integrity of a database. Data security prevents unauthorized users from viewing or updating certain portions of a database.

In one embodiment of the present invention, the database 112 is a configuration management database (CMDB), which records configuration items of a computer system and details about the important attributes and relationships between configuration items. A CMDB is a unified or federated repository of information related to all the components of an information system. A CMDB provides a view to the information technology manager of an organization in order to understand the relationships between the components of the information system. The CMDB further facilitates the monitoring and management of the configuration of the components of the information system. Component and relationship information can be imported from information technology management systems into a CMDB.

In an embodiment of the present invention, the computer systems of computers 120-122 and change management server 108 are one or more Personal Computers (PCs), Personal Digital Assistants (PDAs), hand held computers, palm top computers, lap top computers, smart phones, game consoles or any other information processing devices. A PC can be one or more IBM or compatible PC workstations running a Microsoft Windows or LINUX operating system, one or more Macintosh computers running a Mac OS operating system, or an equivalent. In another embodiment, the computer systems of computers 120-122 and change management server 108 are a server system, such as SUN Ultra workstations running a SunOS operating system or IBM RS/6000 workstations and servers running the AIX operating system.

In an embodiment of the present invention, the network 106 is a circuit switched network, such as the Public Service Telephone Network (PSTN). In another embodiment, the network 106 is a packet switched network. The packet switched network is a wide area network (WAN), such as the global Internet, a private WAN, a local area network (LAN), a telecommunications network or any combination of the above-mentioned networks. In yet another embodiment, the structure of the network 106 is a wired network, a wireless network, a broadcast network or a point-to-point network.

In one embodiment of the present invention, the database 112 includes a plurality of records pertaining to configuration changes. Each record may include a variety of information pertaining to a particular configuration change. For example, a single record may include one or more of the following pieces of data:

- a description of a configuration change
- a description of a configuration status of a computer system before the configuration change was applied
- a date and time of the configuration change
- a name of the user that executed the configuration change
- a result indicator that indicates whether the configuration change was successful and the degree of success
- a comment written by the user about steps or actions that facilitate the configuration change
- a comment written by the user about steps or actions that should not be taken during the configuration change
- a rating indicator that indicates how other users have rated the record with regard to the level of assistance users garnered from the record in effectuating a configuration change
- a date and time for each rating provided by a user on the current record
- one or more comments written by other users about the level of assistance provided by the record when effectuating the configuration change
- a date and time for each comment provided by a user on the current record
- a description of the steps taken to implement the configuration change
- an identification of the location for downloading the configuration change
- a description of the type of resource to which the configuration change was applied
- a description of the relevant versions and fixes previously applied to the resource prior to applying the current configuration change
- an identification of automation scripts that apply the configuration change Any one of the records above can be linked to one or more of the other records in database 112. In another embodiment of the present invention, statistics based on the records in the database 112 are calculated by the change management server 108 and stored as metadata in the database 112. For example, for all records matching a search criteria (such as all records that match a particular description of a configuration change and a particular description of a configuration status of a computer system before the configuration change is applied), an average result indicator, which indicates whether a configuration change was successful, may be calculated and stored periodically.

Figure 2:
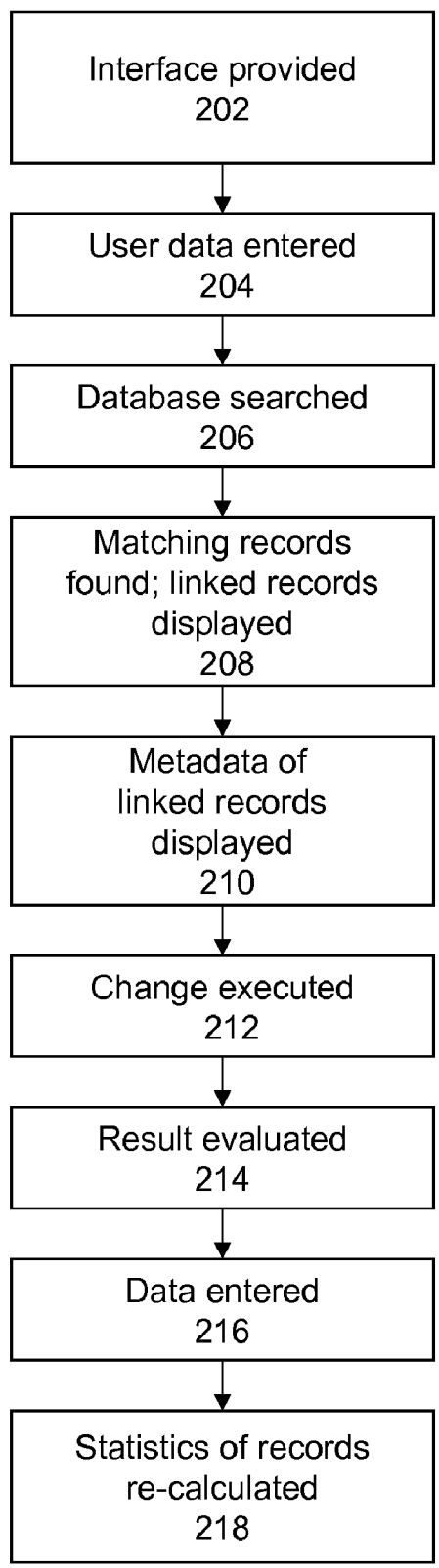
FIG. 2 is a flow chart depicting the control flow of a configuration change data provision process, according to one embodiment of the present invention.

FIG. 2 is a flow chart depicting the control flow of a configuration change data provision process, according to one embodiment of the present invention. The flowchart of FIG. 2 describes the process effectuated by change management server 108 of FIG. 1, so as to facilitate the provision of configuration change data. In another embodiment of the present invention, the flowchart of FIG. 2 describes the process effectuated by a client computer 120, 122 of FIG. 1.

FIG. 2 begins with step 202 wherein an interface, such as a graphical user interface, is provided to the user 150 via his computer 120. In step 204, the user 150 enters into the interface at least a description of a proposed configuration change and a description of a configuration status of the relevant computer system before the configuration change is applied. The user may further enter any data that may be included in a record for the database 112, as described above.

In one embodiment of the present invention, an alternative to step 204 comprises the automated task of acquiring a description of a configuration status of the relevant computer system before the configuration change is applied. In this alternative, a computer program of the present invention analyzes (optionally executing in the background) the computer system to which the proposed configuration change will be applied and gathers the relevant configuration status information.

Figure 3:
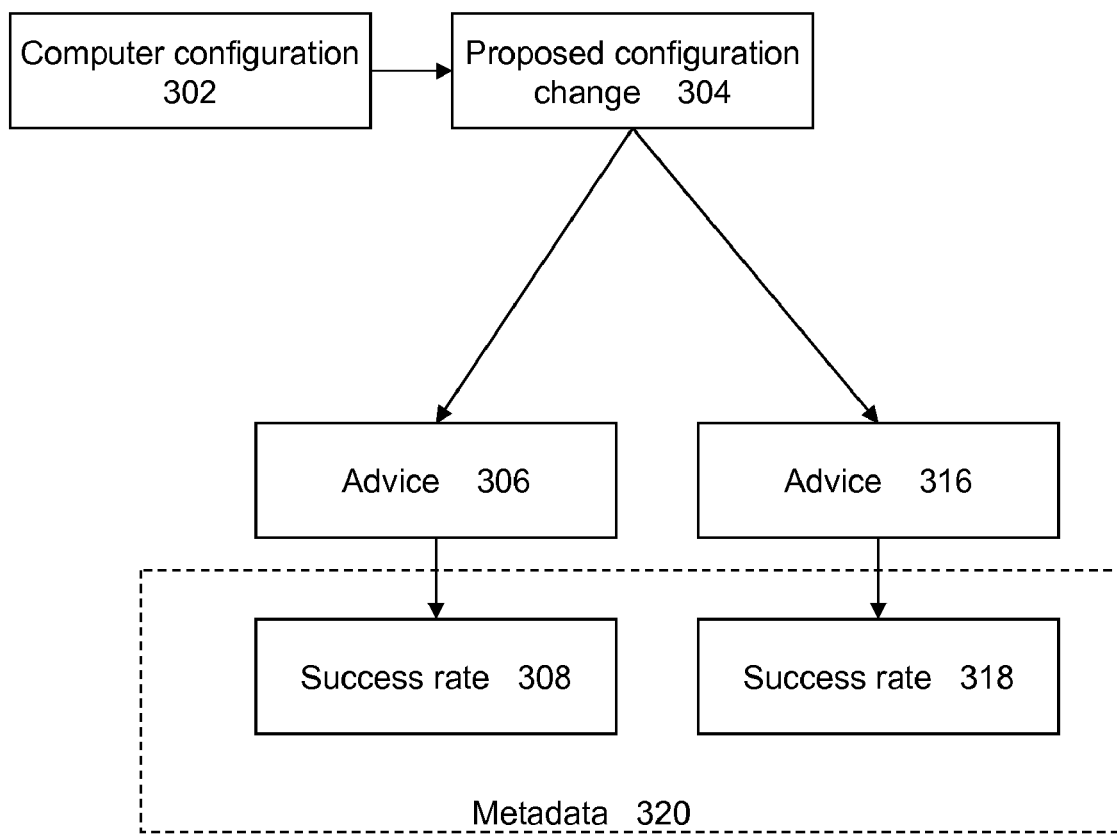
FIG. 3 is a block diagram depicting the linking of records in the configuration change database, in accordance with one embodiment of the present invention.

In step 206, the database 112 is searched for the data defined by the user, or collected by a computer program, in step 204. In one embodiment of the present invention, the records in the database 112 are searched for two linked records matching the data defined by the user or collected by a computer program above, i.e., a search is executed for a record including the description of a proposed configuration change, wherein the record is linked to another record having the description of a configuration status of the relevant computer system. Linked records 302 and 304 of FIG. 3 provide an example of the linked records sought in step 206. In another embodiment of the present invention, the records in the database 112 are searched for records having a data member or members that match the additional data defined by the user 150 above. Step 206 ends with two linked records (such as records 302, 304) in database 112 being found to match the data defined by the user 150 above.

At the conclusion of step 206, two linked records are found—a first record matching the description of a proposed configuration change, which record is linked to a second record matching the description of a configuration status of the relevant computer system. In step 208, additional records linked to the first and second records are brought to the attention of the user 150. Records 306, 308, 316 and 318 of FIG. 3 are examples of relevant records linked to the first two records found (302, 304).

In step 208, the additional records (such as records 306, 308, 316 and 318) are provided in an interface, such as a graphical user interface, to the user 150 via his computer 120. Using the aforementioned interface, the user 150 may browse the one or more records and the data members of each record. The records may include any of the records described above with reference to FIG. 1. Various views of the records may be presented in the user interface, such as a view that presents only user comments for each record or a view that presents only a rating indicator for each record. The user 150 may use the information presented in the interface to determine whether to execute the proposed configuration change and if so, how to go about it.

FIG. 3 shows that advice records 306, 316 are both linked to the proposed configuration change 304. Each advice record 306, 316 provides different configuration change advice and therefore each advice record is linked to a different success rate record, 308, 318, respectively. Thus, for each advice record, a different success rate indicator is provided. Furthermore, a rate of success indicator can be provided to indicate the rate of success for varying subsets and/or permutations of the initial configuration data and the proposed configuration change. Additionally, the present invention can provide statistics and rate of success data for initial configurations that are not an identical match.

Returning to FIG. 2, in step 210, metadata about the one or more records is provided in the interface to the user 150 via his computer 120. The metadata may be, for example, an average result indicator for the one or more records. Success rate records 308, 310, for example, may be averaged to produce metadata 320 pertaining to computer configuration 302 and proposed configuration change 304. The user 150 may further use this information to decide whether to execute the configuration change he has proposed.

After consideration of the information presented to the user 150 in steps 208, 210 above, the user 150 executes the proposed configuration change in step 212. In step 214, the user 150 evaluates the result of the configuration changes. In step 216, the user 150 enters data pertaining to the result of the configuration change into the user interface. In step 216, the user 150 may, for example, enter: 1) a date and time of the configuration change, 2) a result indicator that indicates whether the configuration change was successful, 3) a description of the result of the configuration change, 4) a comment about how to execute the configuration change based on his experience, 5) a description of the steps taken to implement the configuration change, 6) a description of the type of resource to which the configuration change was applied, 7) an identification of automation scripts that applied the configuration change, 8) a rating indicator, which indicates how user 150 rated a record with regard to the level of assistance it provided in effectuating a configuration change, for each record he consulted before he executed the configuration change, 9) written comments written about the level of assistance provided by each record he consulted before executing the configuration change, and 10) any information that may be stored in a record in the database 112, as defined above.

In step 218, any statistics based on sets of records in the database 112 are re-calculated by the change management server 108 to take into account the information entered by the user 150 in step 216 above. For example, metadata 320, an average success rate indicator, which indicates whether a configuration change was successful, may be re-calculated and stored as metadata in the database 112.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a ROM, a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for providing information associated with configuration changes to a computer system, comprising:
   receiving a description of a starting configuration and a description of a configuration change;
   linking the description of the starting configuration and the description of the configuration change;
   reading a record linked to the description of a configuration change, wherein the record includes advice about the configuration change and a total result value indicating a rate of success of the configuration change when the advice is followed;
   receiving a first result value from the user indicating a result of the configuration change in light of the advice, responsive to execution of the configuration change by the user; and
   calculating a new total result value that indicates a rate of success of the configuration change based on the total result value and the first result value.

2. The method of claim 1, further comprising:
   storing in the record the new total result value.

3. The method of claim 2, wherein the first step of receiving further comprises:
   providing to the user a user interface for entering information; and
   receiving from the user interface the description of the starting configuration and the description of the configuration change.

4. The method of claim 2, wherein the step of reading further comprises:
   reading a record linked to the description of a configuration change, wherein the record includes advice about the configuration change, a total result value indicating a rate of success of the configuration change when the advice is followed and a total rating value indicating an amount of assistance provided by the record when executing a configuration change.

5. The method of claim 4, further comprising:
   receiving a first rating value from the user indicating an amount of assistance provided by the record when executing the configuration change, responsive to execution of the configuration change by the user; and
   calculating a new total rating value based on the total rating value and the first rating value.

6. The method of claim 2, wherein the second step of receiving further comprises:
   providing to the user a user interface for entering information; and
   receiving from the user interface the first result value from the user indicating the result of the configuration change in light of the advice, responsive to execution of the configuration change by the user.

7. A computer program product comprising a computer usable storage medium storing computer usable program code for providing information associated with configuration changes to a computer system, the computer program product including:

computer usable program code for receiving a description of a starting configuration and a description of a configuration change;

computer usable program code for linking the description of the starting configuration and the description of the configuration change;

computer usable program code for reading a record linked to the description of a configuration change, wherein the record includes advice about the configuration change and a total result value indicating a rate of success of the configuration change when the advice is followed;

computer usable program code for receiving a first result value from the user indicating a result of the configuration change in light of the advice, responsive to execution of the configuration change by the user; and computer usable program code for calculating a new total result value that indicates a rate of success of the configuration change based on the total result value and the first result value.

8. The computer program product of claim 7, further comprising:

computer usable program code for storing in the record the new total result value.

9. The computer program product of claim 8, wherein the first computer usable program code for receiving further comprises:

computer usable program code for providing to the user a user interface for entering information; and computer usable program code for receiving from the user interface the description of the starting configuration and the description of the configuration change.

10. The computer program product of claim 8, wherein the computer usable program code for reading further comprises:

computer usable program code for reading a record linked to the description of a configuration change, wherein the record includes advice about the configuration change, a total result value indicating a rate of success of the configuration change when the advice is followed and a total rating value indicating an amount of assistance provided by the record when executing a configuration change.

11. The computer program product of claim 10, further comprising:

computer usable program code for receiving a first rating value from the user indicating an amount of assistance provided by the record when executing the configuration change, responsive to execution of the configuration change by the user; and computer usable program code for calculating a new total rating value based on the total rating value and the first rating value.

12. The computer program product of claim 8, wherein the second computer usable program code for receiving further comprises:

computer usable program code for providing to the user a user interface for entering information; and computer usable program code for receiving from the user interface the first result value from the user indicating the result of the configuration change in light of the advice, responsive to execution of the configuration change by the user.

13. A computer for providing information associated with configuration changes to a computer system, comprising:

a repository for storing:
 a description of a starting configuration linked to a description of a configuration change; and
 a record linked to the description of a configuration change, wherein the record includes advice about the configuration change and a total result value indicating a rate of success of the configuration change when the advice is followed;

a user interface for receiving a first result value from the user indicating a result of the configuration change in light of the advice, responsive to execution of the configuration change by the user; and a processor configured for calculating a new total result value that indicates a rate of success of the configuration change based on the total result value and the first result value.

14. The computer of claim 13, wherein the processor is further configured for:

storing in the record the new total result value.

15. The computer of claim 14, further comprising a user interface for receiving the description of the starting configuration and the description of the configuration change.

16. The computer of claim 14, wherein the record includes a total rating value indicating an amount of assistance provided by the record when executing a configuration change.

17. The computer of claim 16, further comprising:

a user interface for receiving a first rating value from the user indicating an amount of assistance provided by the record when executing the configuration change, responsive to execution of the configuration change by the user; and wherein the processor is further configured for calculating a new total rating value based on the total rating value and the first rating value.

* * * * *